United States Patent
Pankajakshan (10) Patent No.: US 8,718,636 B1
(45) Date of Patent: May 6, 2014

(54) SYSTEM AND METHOD FOR EXPEDITED CALL RETRY HANDLING DUE TO VOICE OVER 4G CALL FAILURE

(71) Applicant: MetroPCS Wireless, Inc., Richardson, TX (US)

(72) Inventor: Bejoy Pankajakshan, Plano, TX (US)

(73) Assignee: MetroPCS Wireless, Inc., Richardson, TX (US)

( * ) Notice: Subject to any disclaimer, the term of this patent is extended or adjusted under 35 U.S.C. 154(b) by 0 days.

(21) Appl. No.: 13/773,198

(22) Filed: Feb. 21, 2013

(51) Int. Cl.
*H04W 24/00* (2009.01)

(52) U.S. Cl.
USPC ........ 455/423; 455/424; 455/425; 455/422.1; 455/412.1; 455/403; 455/418

(58) Field of Classification Search
USPC ........... 455/423, 424, 425, 422.1, 412.1, 403, 455/418
See application file for complete search history.

(56) References Cited

U.S. PATENT DOCUMENTS

| | | | |
|---|---|---|---|
| 2011/0191119 A1* | 8/2011 | Schoenberg | 705/2 |
| 2012/0295573 A1* | 11/2012 | Park et al. | 455/404.1 |
| 2012/0307793 A1* | 12/2012 | Taneja | 370/331 |

\* cited by examiner

*Primary Examiner* — Nghi H Ly
(74) *Attorney, Agent, or Firm* — Howison & Arnott, L.L.P.

(57) ABSTRACT

A method for handling failure of a voice over 4G call connection within a wireless call connection includes the steps of detecting an indication of a failure of a voice over 4G link. An event trigger associated with the failure of the voice over 4G link is provided to a mapping database and the database maps the event trigger to at least one predetermined action responsive to indications within the mapping database. At least one predetermined action associated with the event trigger is then performed.

30 Claims, 9 Drawing Sheets

SYSTEM AND METHOD FOR EXPEDITED CALL RETRY HANDLING DUE TO VOICE OVER 4G CALL FAILURE

TECHNICAL FIELD

The present invention relates to voice over 4G call failures, and more particularly to the handling of the call reestablishment process responsive to a voice over 4G call failure.

BACKGROUND

During the setup or occurrence of a voice over 4G call, such as Voice over LTE (VoLTE), there exists the possibility of dropping of the call or failure of the call during setup. During a call setup from a mobile-originating unit to a mobile-terminating unit, the call setup may fail either during the setup of the call from the mobile-originating terminal to the wireless telecommunication system, or from a wireless telecommunication system to the mobile-terminating device. Even once a call has been successfully established between a mobile-originating device and a mobile-terminating device, the possibility exists for failure of the voice over 4G call. Existing solutions may cause the dropping of the call, which of course is an unacceptable situation for the individuals involved in the call. Thus, there is a need for a process for seamlessly and quickly reestablishing a call that has failed within the voice over 4G domain.

SUMMARY

The present invention, as disclosed and descried herein, in one aspect thereof comprises a method for handling failure of a voice over 4G call connection within a wireless call connection and includes the step of detecting an indication of a failure of a voice over 4G link. An event trigger associated with the failure of the voice over 4G link is provided to a mapping database, and the database maps the event trigger to at least one predetermined action responsive to indications within the mapping database. At least one predetermined action associated with the event trigger is then performed.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of a system and method for expedited call retry handling due to voice over 4G call failure are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
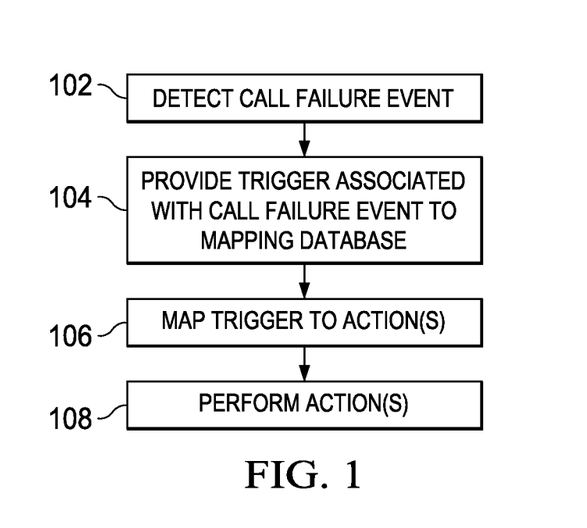
FIG. 1 is a flow diagram describing the general process for controlling a dropped voice over 4G call connection according to the present disclosure.

Referring now to the drawings, and more particularly to FIG. 1, there is illustrated a flow diagram describing the process for controlling a voice over 4G call that is dropped in order to reestablish a call connection. The voice over 4G call may comprise any 4G based voice call such as Voice Over LTE (VoLTE) or other 4G based voice call protocol. Voice over 4G call reconnection process is initiated after a call failure event is detected by the wireless network at step 102. The call failure event may be an occurrence on the mobile-originating side between the originating mobile device and the wireless network or on the mobile-terminating side between the wireless network and the terminating mobile device during initial call connection or may occur after a call between a mobile-originating device and mobile-terminating device drops sometime during an ongoing call.

Responsive to the call failure event, a trigger associated with the call failure is provided to a mapping database that maps particular call failure triggers to particular actions. These trigger events may be any type of call failure event indicating that a voice over 4G call has been dropped. Responsive to the received trigger, the mapping database will map at step 106 the received trigger to a particular action or actions to be carried out responsive to dropping of the voice over 4G call. These actions may range from establishing a new CDMA call link to replace the dropped voice over 4G call link or further tearing down related voice over 4G call links that have been established responsive to a particular call request but have not yet failed. These indicated actions are performed at step 108 in order to continue the call continuity responsive to detection of the particular failure event. Thus, the proposed solution provides a notification to the voice over 4G handset as soon as a failure occurs so that the handset can take the appropriate retry actions on a CDMA network or LTE network. The notification process is events based rather than timer based. Thus, a waiting period is not required in order to establish a new call link.

Figure 2A:
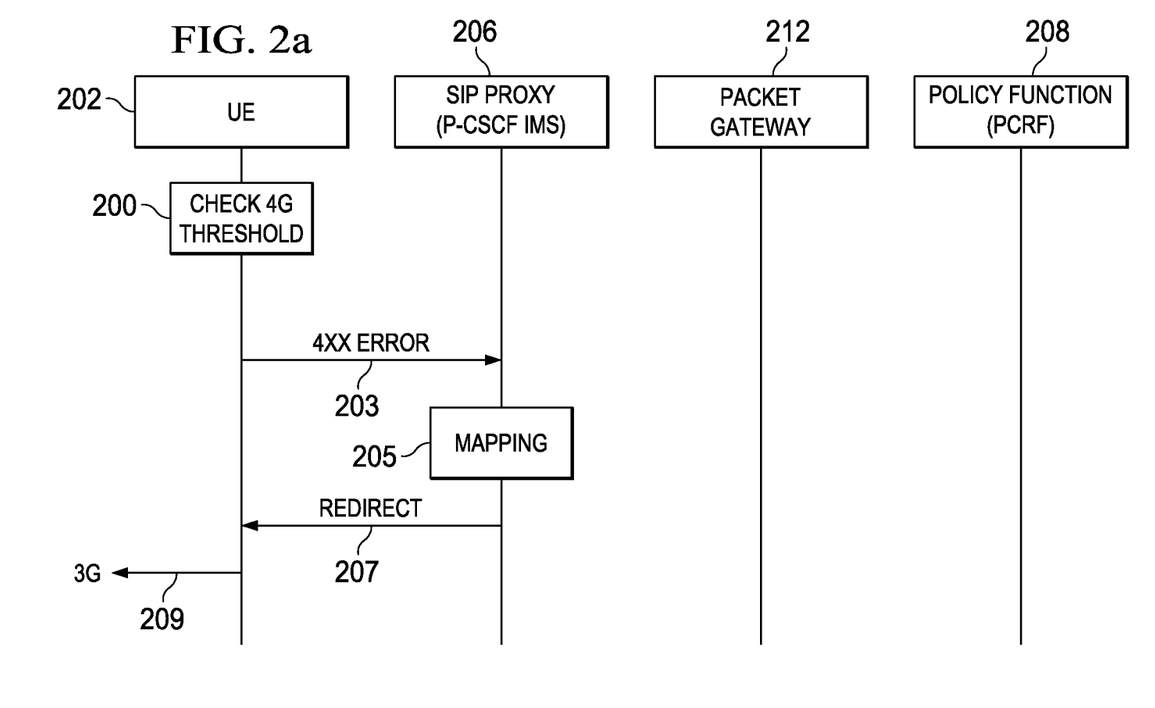
FIG. 2a is a call signaling diagram of a call establishment failing on the mobile originating side due to inability to provide a 4G connection at a desired signal strength level.

Referring now to FIG. 2a, there is illustrated a call diagram for a voice over 4G call wherein the call is mapped to a 3G call due to an initial inability to connect to a 4G network at a predetermined threshold level. Initially at 200, the UE 202 determines if the 4G network can provide a connection signal strength at a predetermined threshold level. If the UE 202 cannot connect to the 4G network at the predetermined threshold level, a 4XX error message 203 is transmitted from the UE 202 to the SIP proxy 206 indicating inability to establish a call at a desired signal strength level. The SIP proxy 206 will map the call to a new action at 205 to cause the generation of a redirect message 207 to the UE 202. The UE 202 will then initiate a call on a 3G network at 209 responsive to the redirect message 207.

Figure 2B:
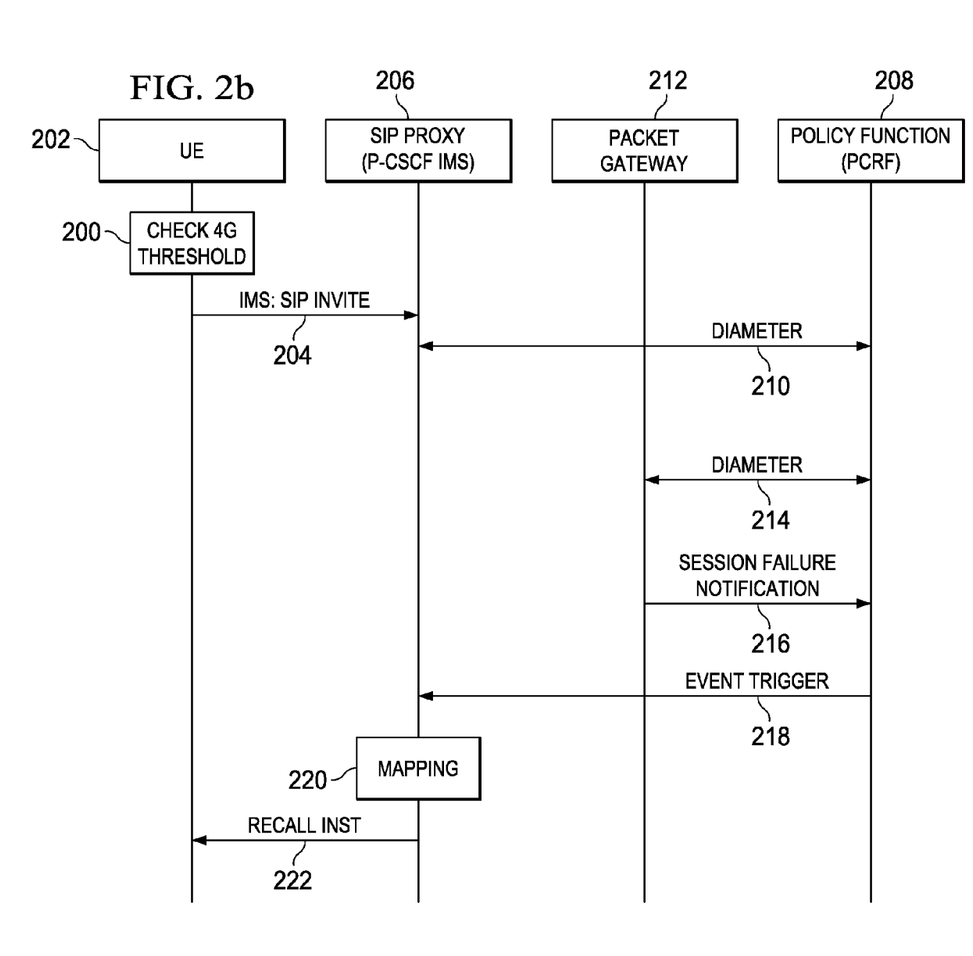
FIG. 2b is a call signaling diagram of a call establishment failing on the mobile-originating side that can provide a 4G connection at a desired signal strength level.

Referring now to FIG. 2b, there is illustrated a call diagram for a voice over 4G call failure that occurs on the originating mobile terminal side during call establishment between the originating user equipment 202 and the VoLTE network when a 4G connection can be provided at the predetermined threshold level. As discussed with respect to FIG. 2a, an initial determination is made at 200 as to whether a 4G call may be provided above the predetermined threshold level. If the 4G network signal strength threshold is met, the user equipment 202 transmits an IMS SIP invite message 204 to the SIP proxy IMS 206. Responsive to the SIP invite message 204, the SIP proxy IMS 206 will transmit a diameter message to the policy function 208 and receive a diameter message in response there to at 210. The diameter message has a specific action AVP requesting a subscription to an indication of a successful resource allocation or an indication of a failed resource allocation. In this case, the indication would be of a failed resource allocation as the call connection failure is occurring on the mobile-originating side. The diameter message exchanges that contain the event trigger indicating the reason for the call failure. The policy function 208 and packet gateway 212 exchange diameter messages (Example, RAR and RAA messages) at 214. The indication of failed resource allocation provided within the diameter messages 210 indicates a particular call failure event. The diameter messages also contain the event triggers.

Figure 3:
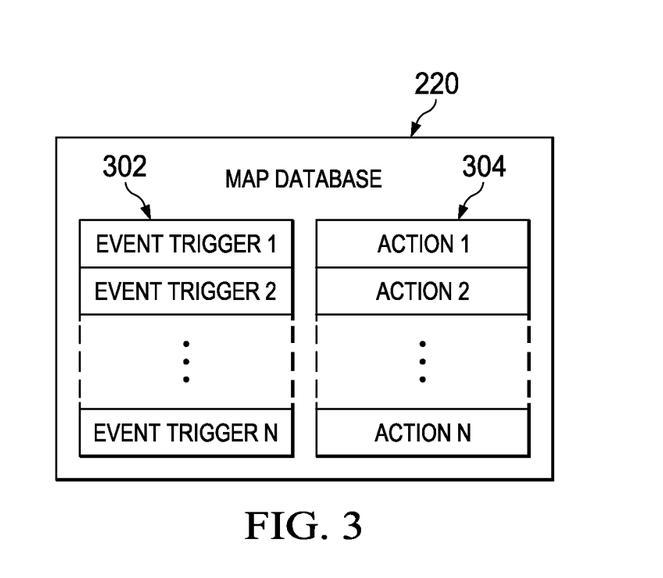
FIG. 3 illustrates a mapping database.

Responsive to this indication of the call failure event within the packet gateway 212, a session failure notification 216 is transmitted to the policy function 208. The session failure notification 216 includes the particular event trigger 218 indicating why the call has failed. The event trigger 218 is accessed within a mapping database 220 to map the particular event trigger to a particular action that is to be carried out by the network responsive to the detected event trigger. The mapping database 220, as illustrated in FIG. 3, includes a plurality of event triggers 302 listed therein, each of which is mapped to a particular action 304. Thus, a particular event trigger may indicate to attempt to reestablish a voice over 4G call or to establish a CDMA call. In the case of FIG. 2, the assumption is made that the mapping indicates the reestablishment of a call link between the wireless network and the user equipment 202 by transmitting a message to establish a CDMA call link using a recall instruction 222.

Figure 4:
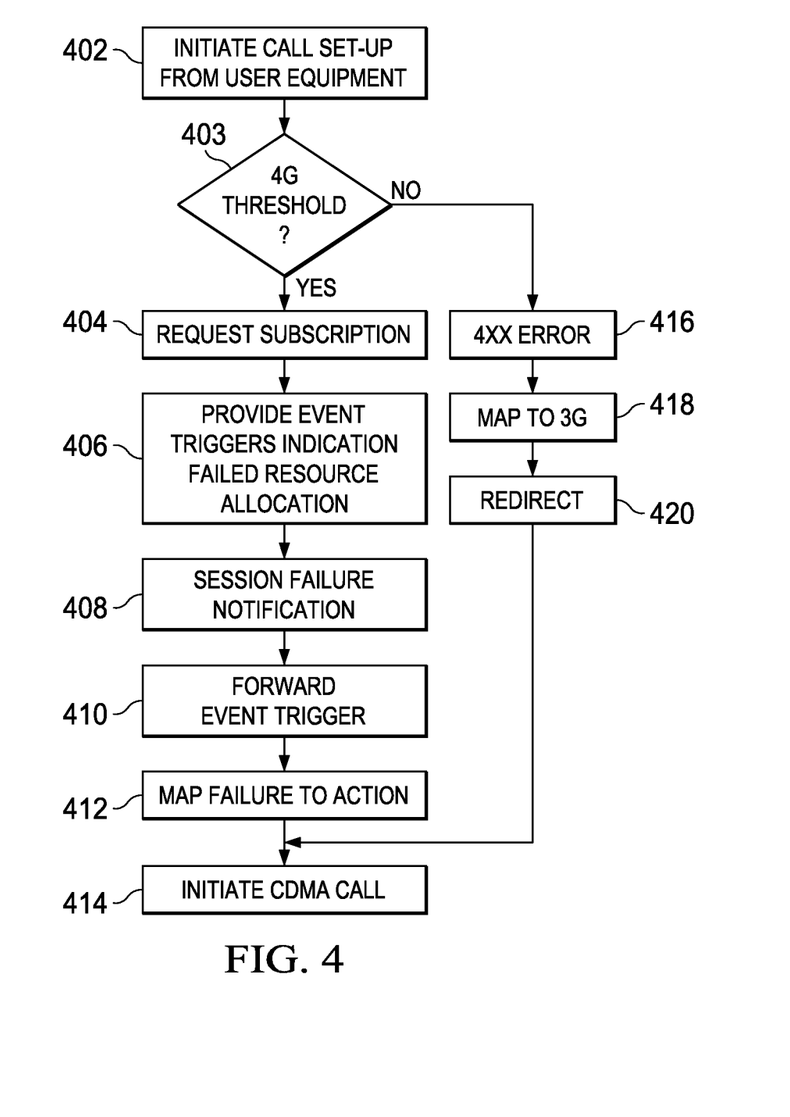
FIG. 4 is a flow diagram describing the process of FIG. 2.

Referring now to FIG. 4, there is illustrated a flow diagram more particularly describing the operation of the mobile-originated call failure described with respect to FIG. 2. The call setup process is initiated at step 402 from the user equipment 202. Inquiry step 403 determines if the voice over 4G call can be established with a signal strength above a predetermined threshold. If the signal strength is sufficient to establish a voice over 4G call, the request for a voice over 4G subscription is provided at step 404. Upon the occurrence of a VoLTE call establishment failure, the event triggers indicating a failed resource allocation are provided at step 406 within the wireless network. The event triggers from the failed resource allocation cause the generation of a session failure notification at step 408, and the event triggers associated with the failed resource allocations are forwarded to the mapping database at step 410. The event triggers are mapped at step 412 to a particular action responsive to the voice over 4G call failure. This causes the initiation of a CDMA call at step 414 to replace the failed VoLTE call connection.

If inquiry step 403 determines that the voice over 4G call cannot be established with the signal strength above the predetermined threshold, a 4XX error message is sent from the UE to a SIP proxy at step 416 where the mapping database will map the call at step 318 to be performed in a 3G network. The call is then redirected at step 420 to the 3G network. While the present description is made with respect to the initiation of a CDMA call at 414 responsive to failure of the voice over 4G call connection, other types of events may be indicated by the mapping database 220 rather than the initiation of a CDMA call.

Figure 5A:
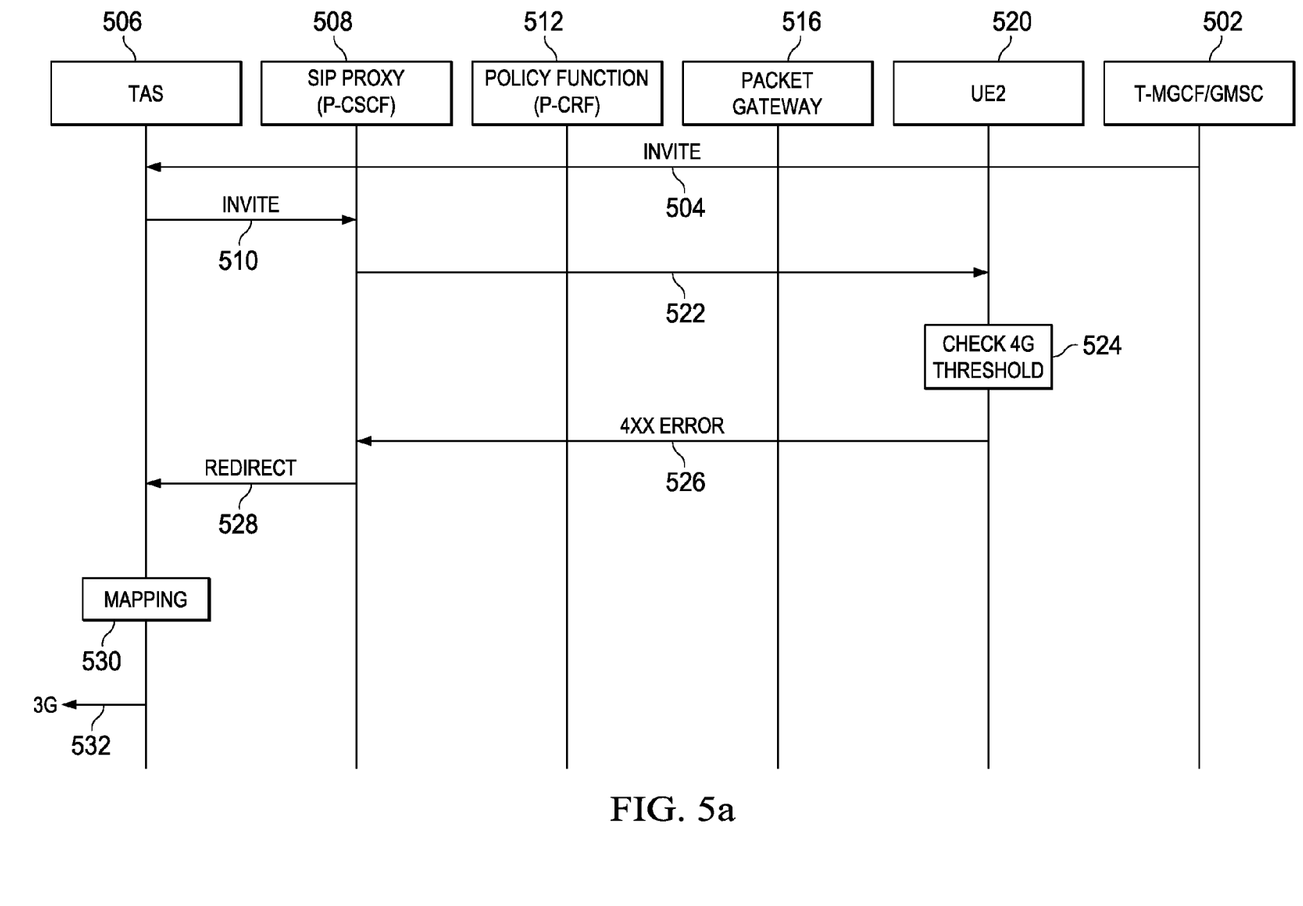
FIG. 5a is a call-signaling diagram describing a call establishment failure on the mobile terminating side due to inability to provide a 4G connection at a desired signal strength level.

Referring now to FIG. 5a, there is illustrated a signaling diagram associated with a first embodiment of a mobile-terminating side voice over 4G call failure. The TMGCF/GMSC 502 transmits an invite message 504 to the terminating application server (TAS) 506. The invite message is further forwarded from the TAS 506 to the SIP proxy 508 (for example the P-CSCF) at 510. The SIP proxy 508 forwards the invite message 522 to the terminating user equipment 520 (UE 2) to determine if the terminating user equipment 520 can provide a connection to a 4G network at a predetermined signal strength threshold level. The terminating user equipment 520 determines at 524 whether a 4G connection may be provided at the predetermined signal strength level. If the connection cannot be provided at the desired signal strength level, a 4XX error message 526 is transmitted from the UE 2 520 to the SIP proxy 508 indicating inability to establish a call at a desired signal strength level. A redirect message 528 is transmitted to the TAS 506 to have the call redirected to a 3G network. The TAS 506 will map the call to a new action at 530. The TAS 506 will then initiate a call on a 3G network at 532 responsive to the mapping 530.

Figure 5B:
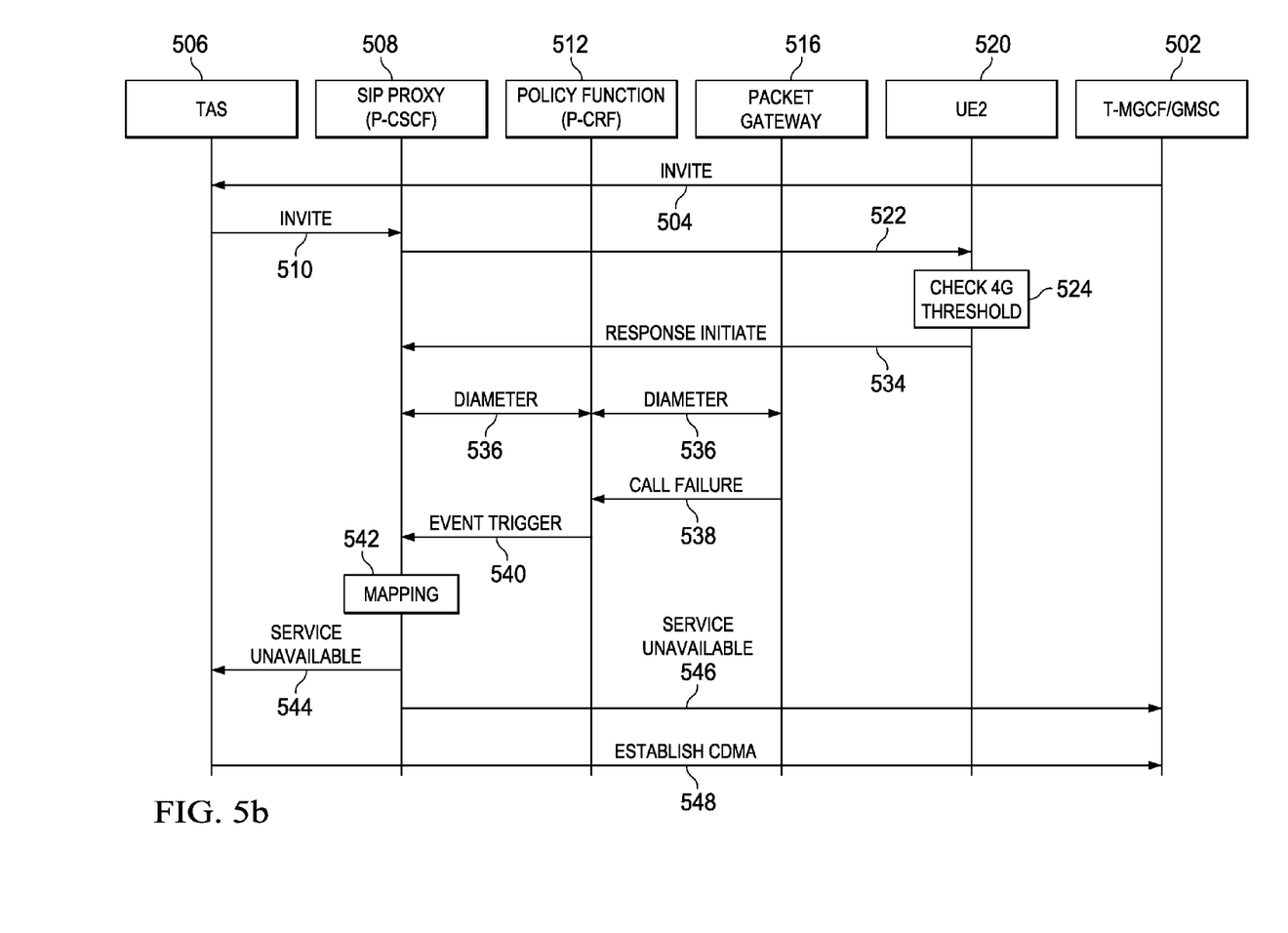
FIG. 5b is a call-signaling diagram describing a call establishment failure on the mobile-terminating side that can provide a 4G connection at a desired signal strength level.

Referring now to FIG. 5b, there is illustrated a signaling diagram associated with a mobile-terminating side voice over 4G call failure when a 4G signal strength may be provided at a sufficient threshold level. The TMGCF/GMSC 502 transmits an invite message 504 to the terminating application server (TAS) 506. The invite message is further forwarded from the TAS 506 to the SIP proxy 508 (for example the P-CSCF) at 510. The SIP proxy 508 forwards the invite message 522 to the terminating user equipment 520 (UE 2) to determine if the terminating user equipment 520 can provide a connection to a 4G network at a predetermined signal strength threshold level. The terminating user equipment 520 determines at 524 whether a 4G connection may be provided at the predetermined signal strength level. If the connection can be provided at the desired signal strength level, a response initiate message 534 is transmitted from the UE 2 520 to the SIP Proxy 508 to attempt to initiate a 4G call connection. The SIP Proxy 508 and Policy function 512 (for example the P-CRF) transmit diameter messages (for example AAR/AAA messages) back and forth between each other at steps 536. As described previously with respect to FIG. 2, the Policy function 512 and packet gateway 514 exchange diameter messages 518. Responsive to determination that a 4G call cannot be established, the packet gateway 516 transmits a call failure indication 538 to the policy function 512. The call failure indication 538 will include event triggers that caused failure of the 4G call establishment. The policy function 512 transmits the included event triggers 540 to the SIP proxy 508. The event trigger 540 utilizes the mapping database 542 to map the event trigger to a particular action. This causes the cancelling of the voice over 4G call leg at steps 544 and 546, and the establishment of a CDMA call 548 is initiated from the TAS 506 to the T-NGCF/GMSC 502.

Figure 6:
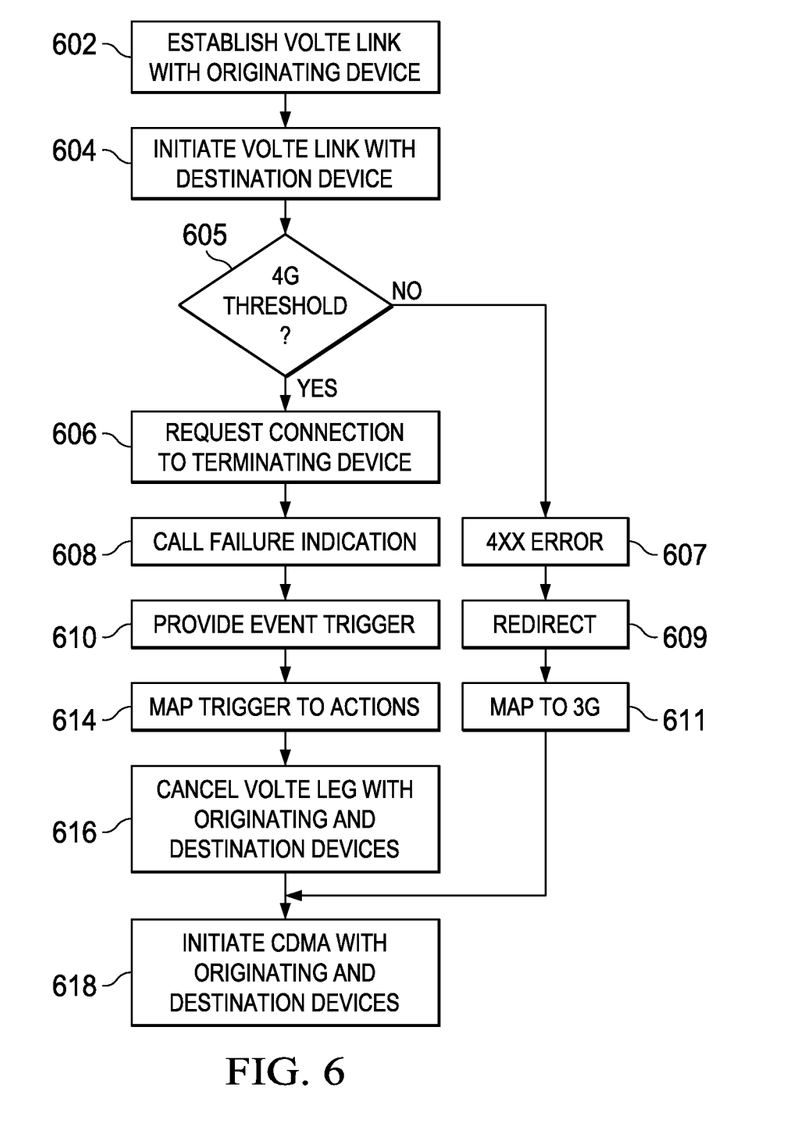
FIG. 6 is a flow diagram describing the process of FIG. 5.

Referring now to FIG. 6, there is illustrated a flow diagram describing a mobile-terminating call failure as illustrated in FIG. 5. Initially the voice over 4G call link is established between a wireless network and the originating device at step 602. The voice over 4G link between the wireless network and the destination device is initiated at step 604. Inquiry step 605 determines if the voice over 4G call can be established with a signal strength above a predetermined threshold. If not, a 4XX error message is generated at step 607 and responsive to the 4XX error message a redirect message to redirect the call to a 3G call is created. The call is mapped at step 611 to a 3G call and the call is carried out in 3G at step 618. If the signal strength is sufficient to establish a voice over 4G call, a connection request is made at step 606 to the terminating device, and when the establishment of the voice over 4G link fails, a call failure indication is provided at step 608. Responsive to the call failure indication, an event trigger is provided at step 610 that is used by the mapping database 220 to map the trigger to a particular action to be carried out at step 614. The first action is a cancellation, at step 616, of the voice over 4G call link signaling with respect to the originating and destination mobile devices. Next, a CDMA call link is established between the wireless network and the originating and destination devices at step 618 to transition the call from a voice over 4G call to a CDMA call. The call proceeds using the CDMA links.

Figure 7:
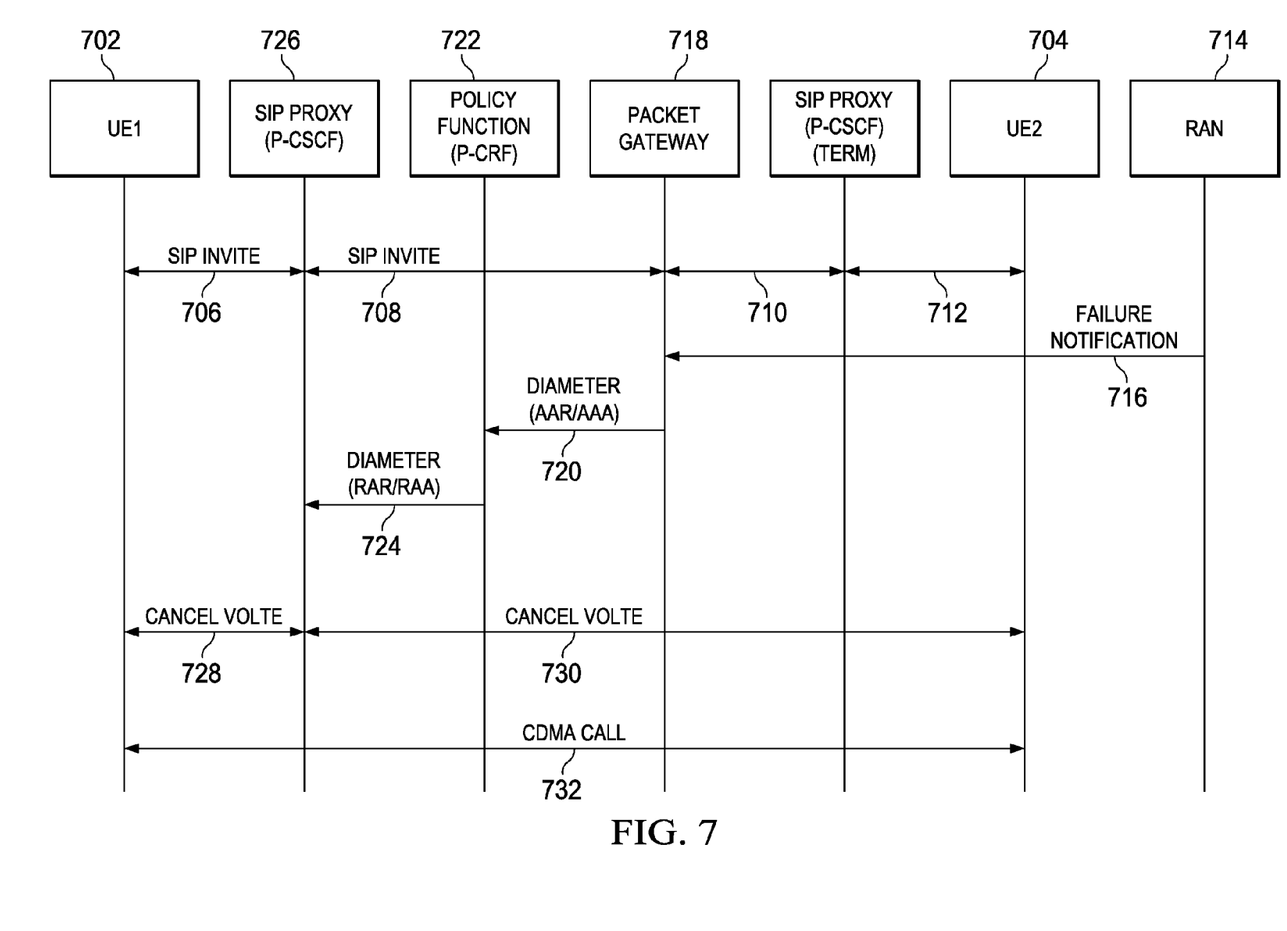
FIG. 7 is a call-signaling diagram illustrating a voice over 4G call failure after the establishment of a voice over 4G call between a mobile-originating device and a mobile-terminating device.

Referring now to FIG. 7, there is illustrated a call failure situation wherein a call has already been established between an originating mobile terminal UE1 702 and a terminating mobile terminal UE2 704. A series of invite messages and session and progress messages are transmitted between the UE1 device 702 and UE2 devices 704 over call links 706 through 712. Upon detection of a call termination event by the RAN (radio access network) 714, a call failure notification 716 is transmitted from the RAN 714 to the packet gateway 718. The packet gateway 718 generates a series of diameter messages 720 to the policy function 722. The policy function 722 generates a series of diameter messages 724 to the SIP proxy 726.

The SIP proxy 726 maps the triggering event indicated within the received messages to particular actions for reestablishment of the call. The SIP proxy 726 generates a cancelled voice over 4G message that cancels the voice over 4G call leg to the UE1 device 702 using messaging 728 and likewise uses messaging 730 to cancel the VoLTE call lag between the SIP proxy 726 and the UE2 device 704. The UE1 device 702 and UE2 device 704 establishes a CDMA call link 732 there between.

Figure 8:
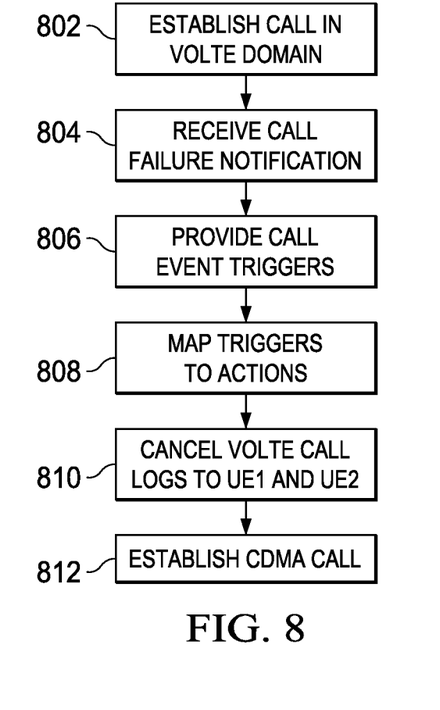
FIG. 8 is a flow diagram illustrating the process of FIG. 7.

Referring now to FIG. 8, there is illustrated a flow diagram describing the operation of a voice over 4G call failure as illustrated in FIG. 7. Initially at step 802 a call is established between the first mobile-originating and mobile-terminating equipment within the voice over 4G domain. A call failure notification is received at step 804 at the packet gateway 718 indicating failure of the voice over 4G call for some reason. A call event trigger included within the failure notification is provided to the mapping database within the SIP proxy 726 at step 806. These triggers are mapped to a particular call action at step 808 using the information within the database. These actions include cancelling of the voice over 4G call lag at step 810 to the originating mobile equipment and terminating mobile equipment. The CDMA call is established at step 812.

In this manner, when failure of a voice over 4G call connection occurs within the network for some reason, reestablishment of a call connection in a CDMA or other wireless network communication protocol may be carried out responsive to the occurrence of particular events indicated by call triggers within generated failure notification messages. This can provide a much more efficient and speedy manner for reestablishing a call connection when the call fails within the voice over 4G domain.

It will be appreciated by those skilled in the art having the benefit of this disclosure that this system and method for expedited call retry handling due to voice over 4G call failure provides an improved manner for reestablishing a call link after a voice over 4G call failure. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for handling failure of a voice over fourth generation 4G call connection within a wireless call connection, comprising:
   detecting an indication of a failure of a voice over fourth generation 4G link;
   providing an event trigger associated with the failure of the voice over fourth generation 4G link to a mapping database;
   mapping the event trigger to at least one predetermined action for establishing a new call link responsive to indications within the mapping database; and
   performing the at least one predetermined action for establishing a new call link associated with the event trigger.

2. The method of claim 1, wherein the step of detecting further comprises the step of detecting failure of the wireless call connection on a mobile originating side of the wireless call connection.

3. The method of claim 2, wherein the mapping further comprises the step of mapping the event trigger to an attempt to establish the wireless call connection as a circuit switched wireless connection.

4. The method of claim 3, wherein the step of performing further comprises the step of attempting to establish the wireless call connection as the circuit switched wireless connection.

5. The method of claim 1, wherein the step of detecting further comprises the step of detecting failure of the wireless call connection on a mobile terminating side of the wireless call connection.

6. The method of claim 5, wherein the step of mapping further comprises the step of mapping the event trigger to disconnect a voice over 4G call connection to a mobile originating device and to attempt to establish the wireless call connection as a circuit switched wireless connection.

7. The method of claim 6, wherein the step of performing further comprises:
   disconnecting the voice over 4G call connection with the mobile originating device; and
   attempting to establish the wireless call connection as the circuit switched wireless connection.

8. The method of claim 1, wherein the step of detecting further comprises the step of detecting failure of the wireless call connection after completion of the wireless call connection between a mobile originating device and a mobile terminating device.

9. The method of claim 8, wherein the mapping further comprises the step of mapping the event trigger to disconnect a voice over 4G call connection to a mobile device still maintaining a voice over 4G call connection and to attempt to establish the wireless call connection as a circuit switched wireless connection.

10. The method of claim 9, wherein the step of performing further comprises:
   disconnecting the voice over 4G call connection from the mobile device maintaining a voice over 4G call connection; and
   attempting to establish the wireless call connection as the circuit switched wireless connection.

11. The method of claim 1, further including the step of:
   determining if the voice over 4G call connection can be established at a predetermined threshold level;
   establishing a 3G call connection if a determination is made the voice over 4G call connection cannot be made at the predetermined threshold level; and
   continuing to attempt to establish the voice over 4G call connection if a determination is made the voice over 4G call connection can be made at the predetermined threshold level.

12. A system for handling failure of a voice over fourth generation 4G call connection within a wireless call connection, comprising:
   a call processing server within a wireless network, wherein the call processing server receives an event trigger associated with the failure of the voice over fourth generation 4G call connection;
   mapping database storing a plurality of event triggers associated with the call processing server, each of the plurality of event triggers indexed to at least one predetermined action for establishing a new call link, wherein responsive to receipt of the event trigger the mapping database maps the event trigger to at least one predetermined action; and
   wherein the call processing server initiates a performance of the at least one predetermined action for establishing a new call link associated with the event trigger.

13. The system of claim 12, wherein the event trigger is associated with a failure of the wireless call connection on a mobile originating side of the wireless call connection.

14. The system of claim 13, wherein the mapping database maps the event trigger to an attempt to establish the wireless call connection as a circuit switched wireless connection.

15. The system of claim 14, wherein the call processing server attempts to establish the wireless call connection as the circuit switched wireless connection responsive to the mapping of the mapping database.

16. The system of claim 12, wherein the event trigger is associated with a failure of the wireless call connection on a mobile terminating side of the wireless call connection.

17. The system of claim 16, wherein the mapping database maps the event trigger to disconnect the voice over 4G call connection to a mobile originating device and to attempt to establish the wireless call connection as a circuit switched wireless connection.

18. The system of claim 17, wherein the call processing server further disconnects the voice over 4G call connection with the mobile originating device and attempts to establish the wireless call connection as the circuit switched wireless connection responsive to the mapping of the mapping database.

19. The system of claim 12, wherein the event trigger is associated with a failure of the wireless call connection after completion of the wireless call connection between a mobile originating device and a mobile terminating device.

20. The system of claim 19, wherein the mapping database maps the event trigger to disconnect the voice over 4G call connection to a mobile device still maintaining the voice over 4G call connection and to attempt to establish the wireless call connection as a circuit switched wireless connection.

21. The system of claim 20, wherein the call processing server further disconnects the voice over 4G call connection with the mobile device maintaining the voice over 4G call connection and attempts to establish the wireless call connection as the circuit switched wireless connection responsive to the mapping of the mapping database.

22. The system of claim 19, wherein the call processing server further:
   determines if the voice over 4G call connection can be established at a predetermined threshold level;
   establishes a 3G call connection if a determination is made the voice over 4G call connection cannot be made at the predetermined threshold level; and
   continues to attempt to establish the voice over 4G call connection if a determination is made the voice over 4G call connection can be made at the predetermined threshold level.

23. A method for handling failure of a voice over fourth generation 4G call connection within a wireless call connection, comprising:
   detecting failure of a voice over fourth generation 4G link of the wireless call connection on a mobile originating side of the wireless call connection;
   providing an event trigger associated with the failure of the voice over fourth generation 4G link to a mapping database;
   mapping the event trigger to an attempt to establish the wireless call connection as a circuit switched wireless connection;
   attempting to establish the wireless call connection as the circuit switched wireless connection responsive to the mapping.

24. The method of claim 23, wherein the circuit switched call connection comprises a code division multiple access CDMA connection.

25. The method of claim 23, further including the step of:
   determining if the voice over 4G call connection can be established at a predetermined threshold level;
   establishing a 3G call connection if a determination is made the voice over 4G call connection cannot be made at the predetermined threshold level; and
   continuing to attempt to establish the voice over 4G call connection if a determination is made the voice over 4G call connection can be made at the predetermined threshold level.

26. A method for handling failure of a voice over fourth generation 4G call connection within a wireless call connection, comprising:
   detecting failure of a voice over fourth generation 4G link of the wireless call connection;
   providing an event trigger associated with the failure of the voice over fourth generation 4G link to a mapping database;
   mapping the event trigger to disconnect a voice over fourth generation 4G call connection to a mobile device still maintaining the voice over fourth generation 4G call connection and to attempt to establish the wireless call connection as a circuit switched wireless connection;
   disconnecting the voice over fourth generation 4G call connection from the mobile device maintaining the voice over fourth generation 4G call connection responsive to the mapping; and attempting to establish the wireless call connection as the circuit switched wireless connection responsive to the mapping.

27. The method of claim 26, wherein the circuit switched call connection comprises a code division multiple access (CDMA) connection.

28. The method of claim 26, wherein the step of detecting further comprises the step of detecting failure of a voice over 4G link of the wireless call connection after completion of the wireless call connection between a mobile originating device and a mobile terminating device.

29. The method of claim 26, wherein the step of disconnecting further comprises disconnecting the voice over 4G call connection from the mobile originating device responsive to the mapping.

30. The method of claim 26, further including the step of:
determining if the voice over 4G call connection can be established at a predetermined threshold level;
establishing a 3G call connection if a determination is made the voice over 4G call connection cannot be made at the predetermined threshold level; and
continuing to attempt to establish the voice over 4G call connection if a determination is made the voice over 4G call connection can be made at the predetermined threshold level.

* * * * *